US007469619B2

(12) United States Patent
Anjanappa et al.

(10) Patent No.: US 7,469,619 B2
(45) Date of Patent: Dec. 30, 2008

(54) ELECTRONIC TORQUE WRENCH WITH A TORQUE COMPENSATION DEVICE

(75) Inventors: Muniswamappa Anjanappa, Ellicott City, MD (US); Russ Bohart, Baltimore, MD (US); Awad Aly Gharib, Cockeysville, MD (US); Xia Chen, Columbia, MD (US)

(73) Assignee: Easco Hand Tools, Inc., Simsbury, CT (US)

( * ) Notice: Subject to any disclaimer, the term of this patent is extended or adjusted under 35 U.S.C. 154(b) by 92 days.

(21) Appl. No.: 11/486,693

(22) Filed: Jul. 14, 2006

(65) Prior Publication Data

US 2007/0119267 A1 May 31, 2007

Related U.S. Application Data

(60) Provisional application No. 60/700,131, filed on Jul. 18, 2005.

(51) Int. Cl.
*G01L 3/02* (2006.01)
*B25B 23/143* (2006.01)
*B25B 23/14* (2006.01)

(52) U.S. Cl. ............................ 81/479; 81/467; 81/478; 73/862.191; 73/862.21

(58) Field of Classification Search . 73/862.21–862.25; 81/478–479, 467, 469
See application file for complete search history.

(56) References Cited

U.S. PATENT DOCUMENTS

| | | | | |
|---|---|---|---|---|
| 4,257,263 | A | 3/1981 | Herrgen | |
| 4,397,196 | A | 8/1983 | Lemelson | |
| 4,558,601 | A | 12/1985 | Stasiek et al. | |
| 4,641,538 | A | 2/1987 | Heyraud | |
| 4,643,030 | A | 2/1987 | Becker et al. | |
| 5,315,501 | A | 5/1994 | Whitehouse | |
| 5,537,877 | A | 7/1996 | Hsu | |
| 5,589,644 | A | 12/1996 | Becker et al. | |
| 6,070,506 | A | 6/2000 | Becker | |
| 6,119,562 | A | 9/2000 | Jenkins | |
| 6,167,788 | B1 | 1/2001 | Schonberger et al. | |
| 6,234,051 | B1 * | 5/2001 | Bareggi | 81/479 |
| 6,276,243 | B1 | 8/2001 | Jenkins | |
| 6,345,436 | B1 | 2/2002 | Codrington | |
| 6,526,853 | B2 | 3/2003 | Jenkins | |
| 6,698,298 | B2 | 3/2004 | Tsuji et al. | |
| 6,968,759 | B2 | 11/2005 | Becker et al. | |
| 6,981,436 | B2 | 1/2006 | Becker et al. | |
| 7,000,508 | B2 | 2/2006 | Li et al. | |
| 7,047,849 | B2 | 5/2006 | Lai | |
| 7,082,865 | B2 | 8/2006 | Reynertson, Jr. | |

(Continued)

*Primary Examiner*—Edward Lefkowitz
*Assistant Examiner*—Jonathan Dunlap
(74) *Attorney, Agent, or Firm*—Nelson Mullins Riley & Scarborough LLP

(57) ABSTRACT

An electronic torque wrench for driving a workpiece includes a wrench body having a handle end and a wrench head receiving end. A wrench head a workpiece receiving end and a mounting end, and the mounting end is removably received by wrench head receiving end. A user interface having a processor and a display is mounted on the wrench body. A wrench head sensing device is carried by the wrench head receiving end and includes an electrical connection between the wrench head sensing device and the processor. The wrench head sensing device sends an electrical signal to the processor indicating the presence of the wrench head on the wrench head receiving end.

18 Claims, 7 Drawing Sheets

U.S. PATENT DOCUMENTS

| | | | |
|---|---|---|---|
| 7,082,866 | B2 | 8/2006 | Becker |
| 7,089,834 | B2 | 8/2006 | Reynertson et al. |
| 2002/0170395 | A1 | 11/2002 | Wang et al. |
| 2002/0178876 | A1 | 12/2002 | Wang et al. |
| 2004/0255733 | A1 | 12/2004 | Reynertson, Jr. |
| 2005/0061119 | A1 | 3/2005 | Becker |
| 2005/0072278 | A1 | 4/2005 | Cutler et al. |
| 2005/0092143 | A1 | 5/2005 | Lehnert et al. |
| 2005/0223856 | A1 | 10/2005 | Reynertson et al. |

* cited by examiner

ELECTRONIC TORQUE WRENCH WITH A TORQUE COMPENSATION DEVICE

CLAIM OF PRIORITY

This application claims priority to U.S. Provisional Application 60/700,131 filed Jul. 18, 2005.

FIELD OF THE INVENTION

The present invention relates generally to electronic torque wrenches and extensions for use therewith. More particularly, the present invention relates to a device for use with torque wrenches that identifies an extension being used with the wrench and compensates displayed torque values accordingly.

BACKGROUND OF THE INVENTION

Often, fasteners used to assemble performance critical components require tightening to a specified torque level. A popular method of tightening such fasteners is through the use of a torque wrench. The accuracy and reliability of these wrenches is important to insuring that the fasteners are properly tightened the specified torque levels.

Torque wrenches vary from simple mechanical types to sophisticated electronic types. Mechanical type torque wrenches are generally less expensive than electronic ones. There are two common types of mechanical torque wrenches, beam and clicker types. With beam type torque wrenches, a beam bends relative to a non-deflecting beam in response to the torque applied. The amount of deflection of the bending beam relative to the stationary beam is indicative of the torque applied. Clicker type torque wrenches work by pre-loading a snap mechanism with a spring to release at a specified torque, thereby generating a click noise.

Electronic torque wrenches (ETW) tend to be more expensive than mechanical torque wrenches, and more accurate as well. Often, ETWs allow a user to preset a torque limit, store data for later retrieval by the user, and alert the user when the torque limit is reached. ETW models range from relatively low-cost basic models to expensive models with multiple features.

Regardless of which type ETW is used, torque extensions may be required to tighten fasteners that are in locations that the torque wrench will not reach. One of the most common methods of attaching a torque extension to an ETW is to replace the original drive head with an extension that has its own drive head. Once the extension is inserted, the readings of the ETW must usually be corrected for any change in lever arm length due to the extension. With the extension in place, the actual torque experienced by the fastener will be either higher or lower than what is actually displayed on the ETW, depending on whether the extension extends outwardly or inwardly from the end of the ETW, respectively.

For each different length extension, a different correction factor must be calculated. Typically, the end user calculates a correction factor and either divides or multiplies the desired final actual torque value to be applied to the fastener by this correction factor to determine the final compensated set torque value (as displayed by the ETW) that is to be input into the ETW. Whether the actual torque value is divided by or multiplied by the correction factor is dependent upon the method of determining the correction factor. The final compensated set torque value is the value at which, when displayed, the user ceases to apply torque to the fastener. Typically, the user will only know the final compensated set torque value accurately and is not able to accurately determine the intermediate torque values. In other words, the user only calculates the final compensated set torque value for the set torque and will not be able to continuously monitor the actual torque values during torquing operations as only “compensated” values are displayed by the ETW. This situation can lead to over and under-torquing, possibly resulting in loss of performance of the fasteners.

The present invention recognizes and addresses the foregoing considerations, and others, of prior art constructions and methods.

SUMMARY OF THE INVENTION

One embodiment of the present invention provides an electronic torque wrench for driving a workpiece, the torque wrench including a wrench body having a handle end and a wrench head receiving end. A wrench head includes a workpiece receiving end and a mounting end that is removably received by the wrench head receiving end of the wrench body. A user interface including a processor and a display is routed on the wrench body. A wrench head sensing device is carried by the wrench head receiving end and includes an electrical connection between the wrench head sensing device and the processor so that the wrench head sensing device can send an electrical signal to the processor indicating the presence of the wrench head on the wrench head receiving end.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figures 1, 2A:
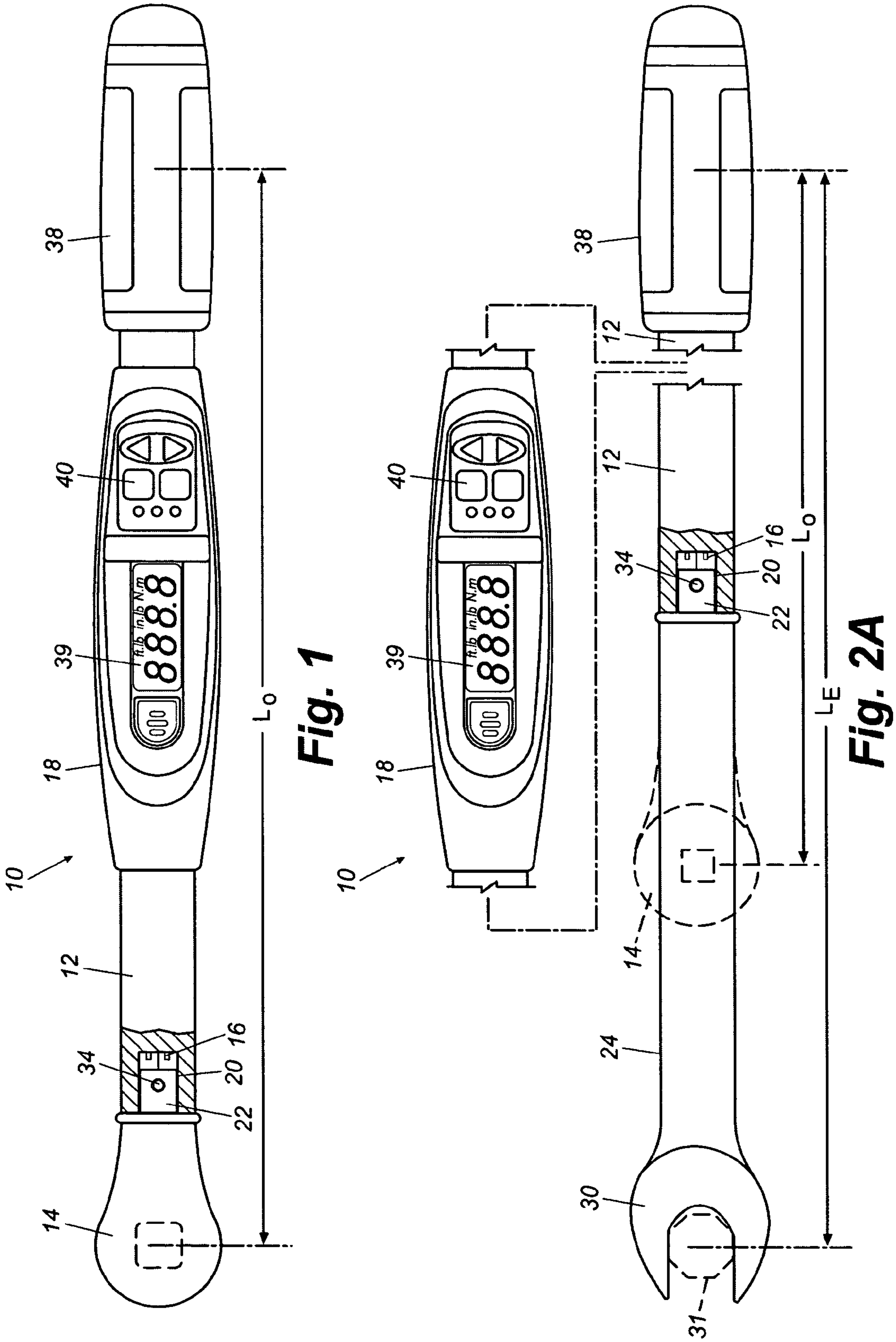
FIG. 1 is a partially cut-away top view of an electronic torque wrench including a torque compensation device in accordance with an embodiment of the present invention.
FIGS. 2A through 2C are partially cut-away top views of the electronic torque wrench as shown in FIG. 1, including a variety of different extensions.

Repeat use of reference characters in the present specification and drawings is intended to represent same or analogous features or elements of the invention according to the disclosure.

DETAILED DESCRIPTION OF THE PREFERRED EMBODIMENTS

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to FIG. 1, an electronic torque wrench including a torque compensation device in accordance with the present invention is shown. The electronic torque wrench 10 includes a wrench body 12, a ratchet/wrench head 14, an extension sensor probe 16, and an electronic unit 18. Preferably, the wrench body 12 is of tubular construction, made of steel or other rigid material, and houses a strain tensor for measuring torque applied by torque wrench 10 to a fastener. As shown, a socket 20, typically of rectangular or square cross-section, accepts a correspondingly shaped projection, or mounting boss 22, on wrench head 14, or alternatively, a torque extension.

Various configurations of torque extensions, such as extension 24 (FIG. 2A), extension 26 (FIG. 2B), and extension 28 (FIG. 2C) can be used with the torque compensation device of the invention. Extensions 24 and 26 shown in FIGS. 2A and 2B, respectively, include spanner wrench ends 30 for engaging a fastener 31, whereas extension 28 shown in FIG. 2C includes a ratchet head 32 for engaging a fastener. Other extensions that can be used can include a ratcheting square drive head, a box-end wrench head, a hex drive head, a square drive head, a socket, etc. As well, the rectangular cross-section of socket 20 is only a preferred embodiment and sockets with other cross-sectional shapes are within the scope of this invention.

As shown in FIG. 2A, extension 24 includes mounting boss 22 that is rectangular in cross-section and wrench body 12 includes a correspondingly shaped socket 20. To connect extension 24 to wrench 10, mounting boss 22 is inserted into socket 20 of wrench body 12 until a spring loaded detent pin 34 on the projection snaps into a corresponding aperture 36 (FIG. 4) formed in the wall of socket 20. Wrench body 12 includes a hand gripper 38 at its distal end for allowing the user to comfortably grasp and operate wrench 10. Electronic unit 18 is mounted to wrench body 12 between hand gripper 38 and the drive end. Electronic unit 18 includes electronic circuits (FIGS. 5 through 7) to receive signals from the strain tensor and convert them to equivalent torque values being applied by torque wrench 10 at wrench head 14. Electronic unit 18 includes the electronic circuitry of the torque compensation device as well as a printed circuit board (not shown) with electronic components, a liquid crystal display (LCD) 39, batteries (not shown), and a switch bank 40.

Figure 2B:
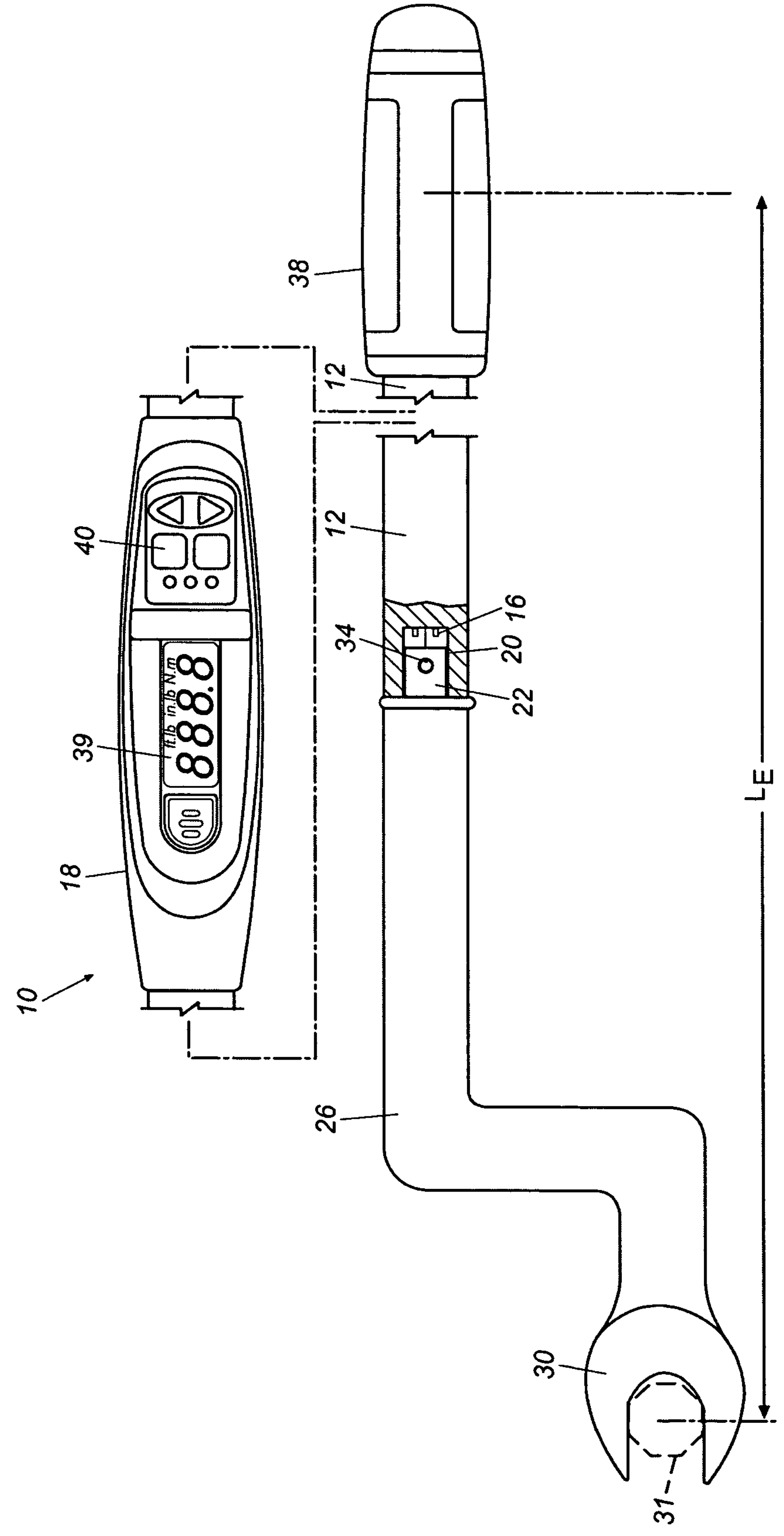
Figure 2C:
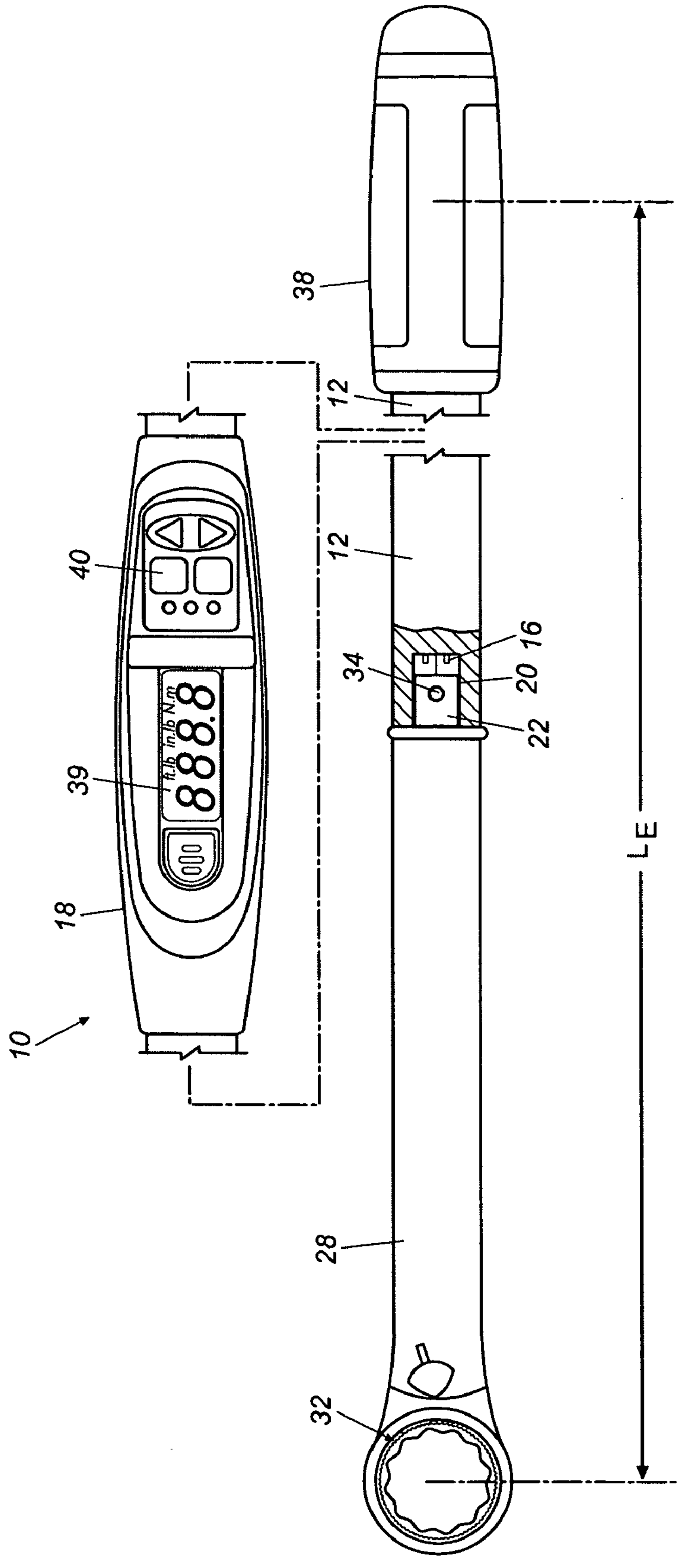

The torque extensions shown in FIGS. 2A through 2C are all extensions that are inserted after removing the standard wrench head 14 with which electronic torque wrench 10 is designed to provide torque measurements with. Alternately, embodiments of electronic torque wrenches can have integrated ratchet heads as part of the strain tensor which are not removable. As such, embodiments of the invention can be configured to work with a torque wrench having an integrated ratchet head. For example, various embodiments include contact switches mounted on the drive boss of the wrench head that are switched on or off when an extension having a socket with a unique pattern of projections is mounted on the drive boss.

Figure 3:
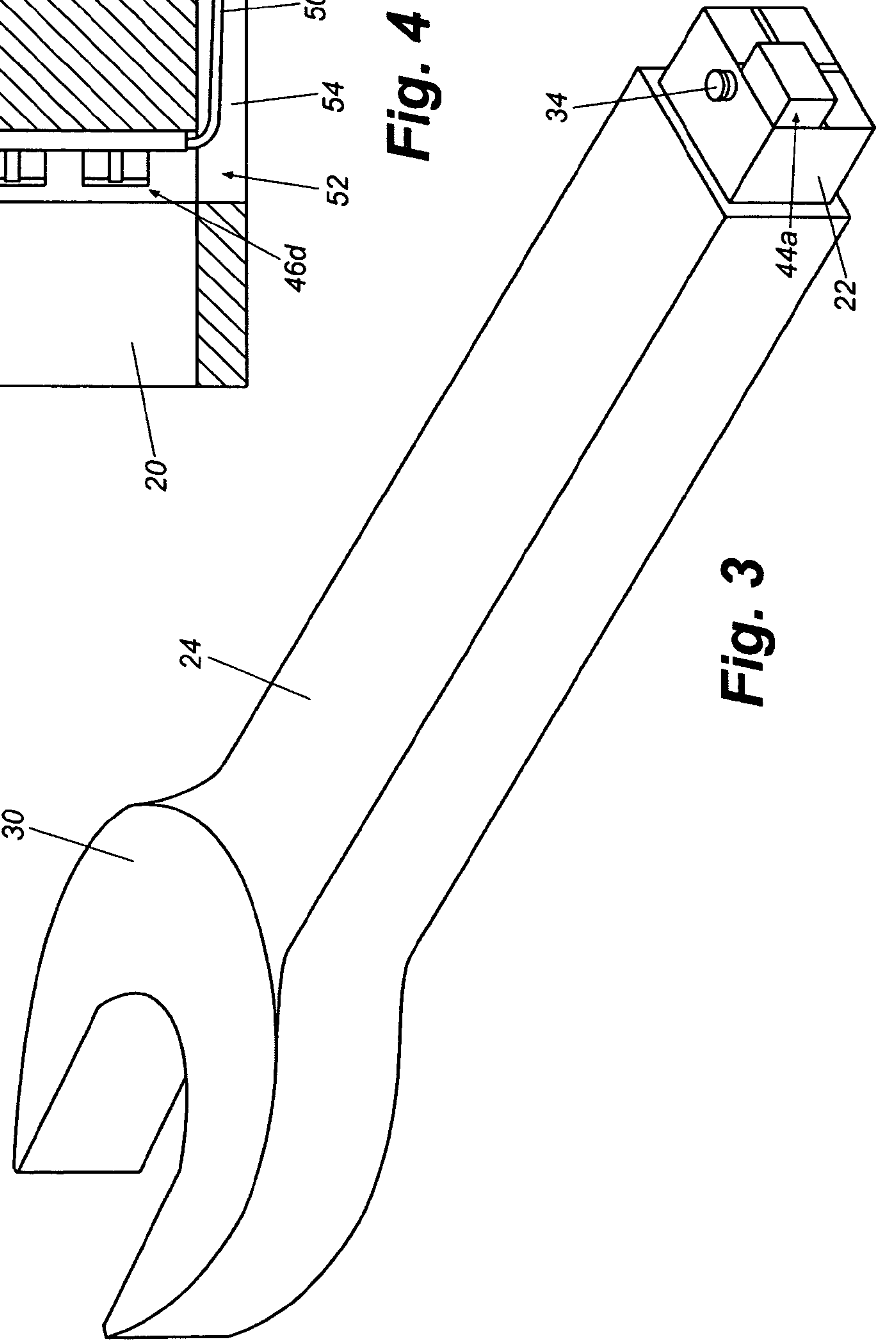
FIG. 3 is a perspective view of a spanner head extension for use with the electronic torque wrench as shown in FIG. 1.

Referring now to FIGS. 2A and 3, torque extension 24 including a spanner head 30 is shown. Torque extension 24 includes mounting boss 22 with a spring loaded pin 34 for engaging aperture 36 (FIG. 4) formed in the wall of socket 20 on wrench body 12. As shown, the extension's mounting boss 22 has a rectangular cross-section including up to four detent projections 44 extending outwardly therefrom that correspond to four contact switches 46*a*, 46*b*, 46*c* and 46*d* on extension sensor probe 16 (FIG. 4) mounted in socket 20 of wrench body 12.

Mounting projection 22 of spanner extension 24 includes one of the four possible detent projections 44*a* extending therefrom that identifies the torque extension to the torque compensation device as Extension-1000, or Extension-8 (see Table 1). Since there are four contact switches in the preferred embodiment, it is possible to uniquely identify up to 16 torque extensions (2 to the power of 4) that can be automatically detected so that the displayed torque values may be compensated for. An example list of possible extensions is shown in Table 1. Of the sixteen extensions, the first one (Extension-0/Extension-0000) is reserved for the standard ratchet head 14 shown in FIG. 1, leaving a total of fifteen extensions that can be uniquely identified by the torque compensation device. The number of extensions that can be automatically detected can be increased by increasing both the number of contact switches 46 and detent projections 44. For example, the number of extensions that can be automatically detected can be increased to 32 if the number of contact switches 46 and detent projections 44 is increased to five each (2 to the power of 5).

Figure 4:
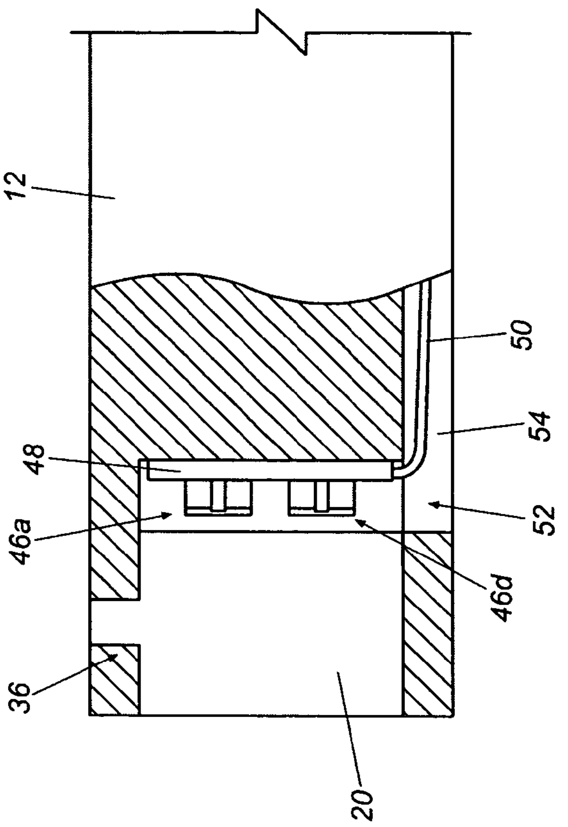
FIG. 4 is a partial cross-sectional side view of the socket of the electronic torque wrench as shown in FIG. 1, taken along line 4-4.

FIG. 4 shows a close up view of socket 20 formed in wrench body 12 with extension sensor probe 16 mounted therein. As noted, socket 20 is of rectangular cross-section with aperture 36 configured to receive spring-loaded detent pin 34 on the standard ratchet head and extensions. Sensor probe 16 includes a printed circuit board (PCB) 48 with contact switches 46 mounted thereon. The entire unit is preferably encapsulated in a soft polymer material (not shown for ease of description) that is sealed to prevent entry of foreign material, yet allows each contact switch to operate independently of the remaining switches. The four contact switches on PCB 48 are normally inactive. When the mounting boss of standard ratchet head 14 (FIG. 1) (Extension-0 of Table 1) is inserted into socket 20, none of contact switches 46*a* through 46*d* are activated. For all other extensions, (Extension-1 through Extension-15) at least one of contact switches 46*a* through 46*d* (46*b* and 46*c* are not shown) will be activated. Any signals produced by the four switches are carried to the printed circuit board (not shown) of electronic unit 18 by a bundle of wires 50 routed through a hole 52 and a slot 54 formed in wrench body 12. Note, depending on the configuration of wrench body 12, wires 50 may be routed through an internal cavity of the body, thereby negating the need for slot 54.

Figure 5:
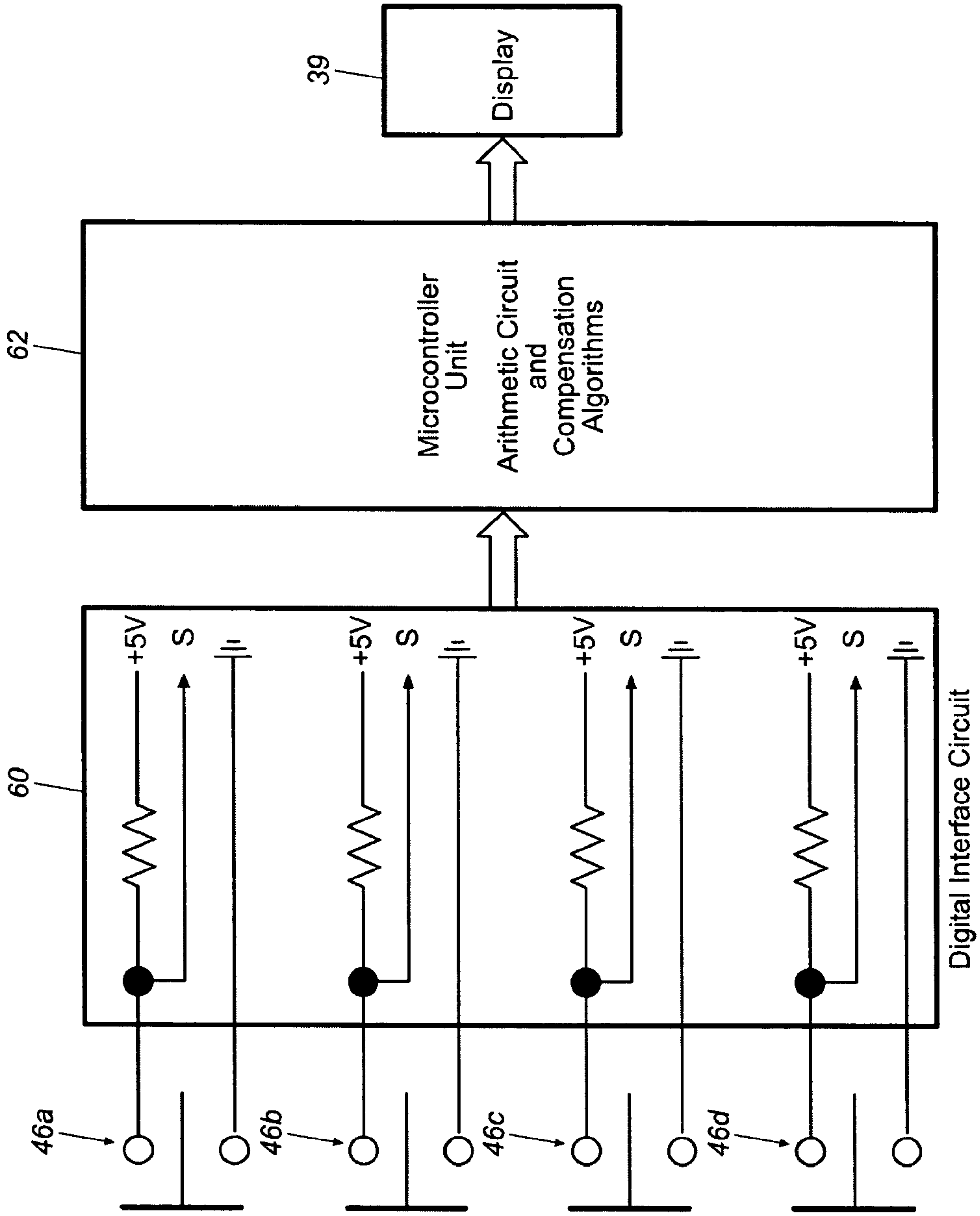
FIG. 5 is a schematic of an electronic circuit of the torque compensation device as shown in FIG. 1.
Figure 6:
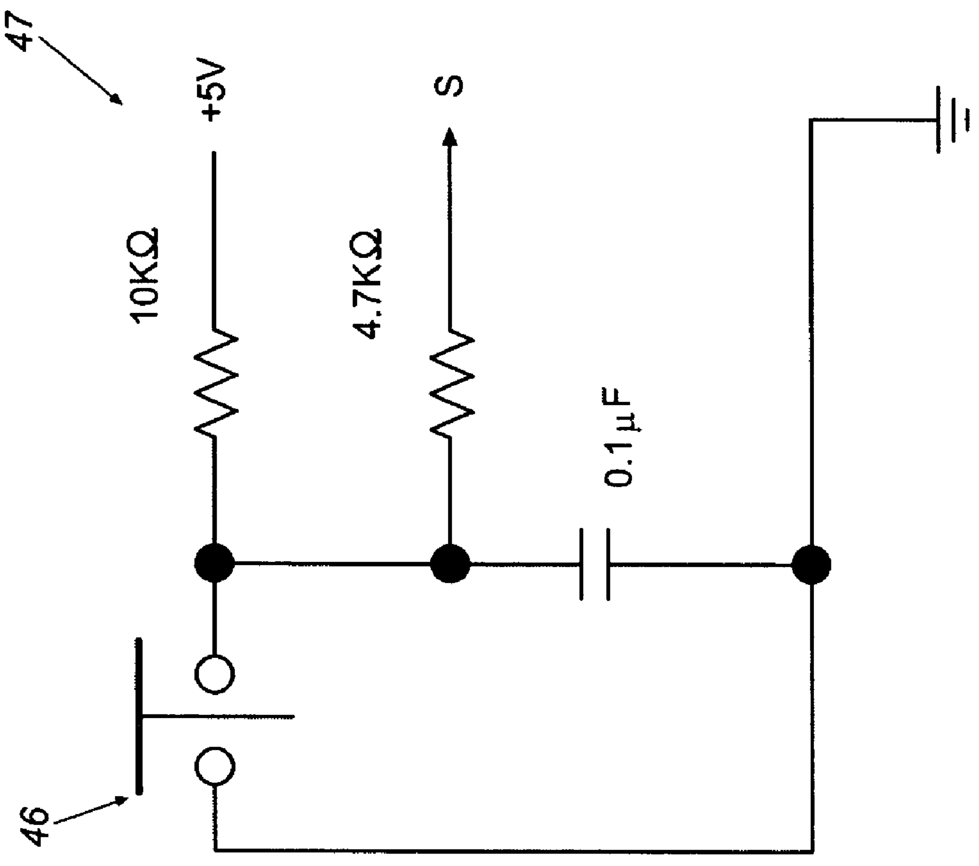
FIG. 6 is a schematic diagram of an electronic circuit of the torque compensation device as shown in FIG. 1.
Figure 7:
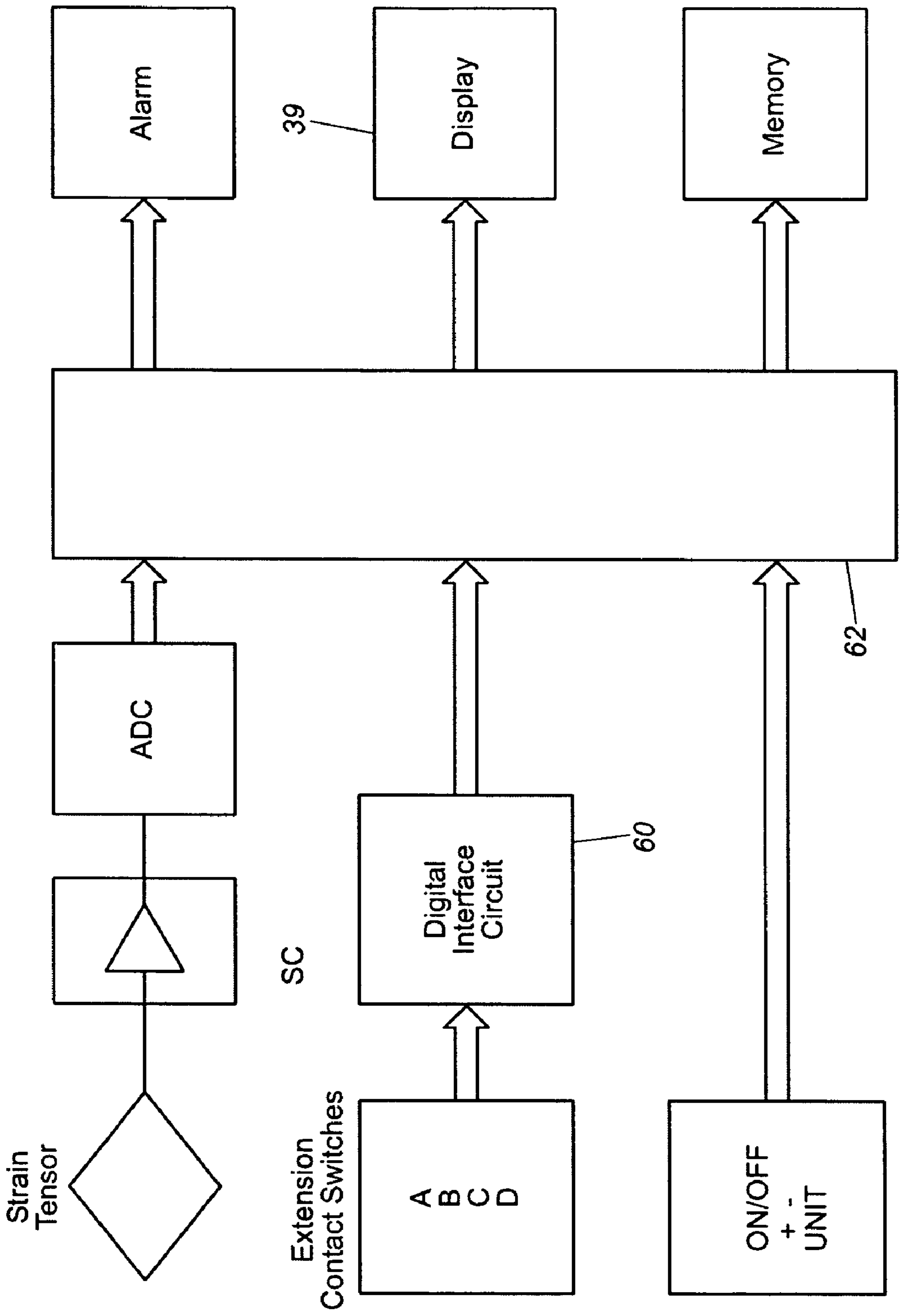
FIG. 7 is a schematic diagram of the electronic circuit of the torque compensation device integrated with the electronic circuit of the electronic torque wrench as shown in FIG. 1.

Referring now to FIGS. 5 through 7, FIG. 5 shows an electronic circuit of the torque compensation device. When a torque extension is inserted into socket 20, at least one contact switches 46*a* through 46*d* is activated and an electrical signal is generated. In the preferred embodiment, each switch is active-low (i.e., normally closed with a high signal and opens when activated with a low signal). There are other possible types of circuits, for example, an active-high type, that fall within the scope of this invention. Also, a debouncing circuit 47 can be added to the contact switches to eliminate multiple signals when an extension is first inserted, as shown in FIG. 6. The debouncing feature adds a low-pass filter that filters out rapidly alternating voltage levels caused by multiple unintended contacts with a switch. Simply put, the low pass filter filters out high frequency changes in voltage levels. For example, when inserting an extension into the socket of the wrench, it is possible that the user could inadvertently depress an improper switch temporarily. When a switch is pressed, for example, for one tenth of a second, the processor may actually sample this signal many thousands of times. This feature is used to avoid getting false readings as to which switches are actually depressed by insertion of the extension, thereby insuring proper identification of the extension. The four contact switch signals are connected to a digital interface circuit 60 that provides power and buffers the input signals. The digital signals are then input to a microcontroller unit 62. FIG. 7 is a schematic diagram of the electronic circuit of the torque compensation device incorporated into the electronic circuit of the electronic torque wrench shown in FIG. 1.

The combination of detent projections 44 on mounting boss 22 of the extension and contact switches 46 on extension sensor probe 16 mounted in socket 20 of wrench body 12 is used in the preferred embodiment of this invention for illustration purposes. It will be understood by those skilled in the art that the basic function of sensing the torque extension can be done with other types of combinations, such as inserts having varying material properties from one to the next can be mounted on the mounting boss of the extension and optical, magnetic, hall-effect, inductance, capacitance, etc., sensors can be included in the socket of the wrench body for identifying the various materials based on their properties, therefore identifying the extension.

After the signal has reached the microcontroller unit, the torque compensation device determines the extension number of the extension that has been inserted in the torque wrench and displays the extension number on LCD 39 (FIG. 1) for the user to see and verify. The microcontroller unit then calculates the compensated actual torque value using the following equation:

$$T_{ACT}=T_{ORIG}*(L_E/L_O)$$

where ($T_{ACT}$) is the actual torque applied to the fastener with the torque extension; (Torig) is the torque that would have been applied to the fastener if the standard ratchet head 14 (FIG. 1) were being used; $L_E$ is the distance between the center point of hand gripper 38 and the center of the fastener to be torqued with the torque extension (Extension-1 through Extension-15 in the present case); and $L_O$ is the distance between the center of hand gripper 38 and the center of the fastener if standard ratchet head 14 (also called Extension-0 in the present case) were being used.

The compensated torque value actually applied to the fastener with the torque extension is then output to electronic unit 18 that displays the current compensated actual torque value on LCD 39. Also, if selected, a peak hold feature records the maximum actual torque value reached during the torquing of the fastener and displays the value on LCD 39.

While one or more preferred embodiments of the invention are described above, it should be appreciated by those skilled in the art that various modifications and variations can be made in the present invention without departing from the scope and spirit thereof. It is intended that the present invention cover such modifications and variations as come within the scope and spirit of the appended claims and their equivalents.

TABLE 1

| Name | A | B | C | D |
|---|---|---|---|---|
| Extension-0/Extension-0000 | 0 | 0 | 0 | 0 |
| Extension-1/Extension-0001 | 0 | 0 | 0 | 1 |
| Extension-2/Extension-0010 | 0 | 0 | 1 | 0 |
| Extension-3/Extension-0011 | 0 | 0 | 1 | 1 |
| Extension-4/Extension-0100 | 0 | 1 | 0 | 0 |
| Extension-5/Extension-0101 | 0 | 1 | 0 | 1 |
| Extension-6/Extension-0110 | 0 | 1 | 1 | 0 |
| Extension-7/Extension-0111 | 0 | 1 | 1 | 1 |
| Extension-8/Extension-1000 | 1 | 0 | 0 | 0 |
| Extension-9/Extension-1001 | 1 | 0 | 0 | 1 |
| Extension-10/Extension-1010 | 1 | 0 | 1 | 0 |
| Extension-11/Extension-1011 | 1 | 0 | 1 | 1 |
| Extension-12/Extension-1100 | 1 | 1 | 0 | 0 |
| Extension-13/Extension-1101 | 1 | 1 | 0 | 1 |
| Extension-14/Extension-1110 | 1 | 1 | 1 | 0 |
| Extension-15/Extension-1111 | 1 | 1 | 1 | 1 |

What is claimed is:

1. An electronic torque wrench for driving a workpiece, comprising:

a wrench body having a handle end and a wrench head receiving end including a socket formed therein;

a wrench head having a workpiece receiving end and a mounting end including a mounting boss, said mounting boss of said mounting end being removably received by said socket of said wrench head receiving end;

a user interface having a processor and a display;

a wrench head sensing device carried by said wrench head receiving end;

an electrical connection between said wrench head sensing device and said processor; and wherein said wrench head sensing device includes a plurality of pressure switches and said mounting boss includes at least one projection, each said projection for activating one of said pressure switches when said mounting boss is inserted in said socket;

wherein said wrench head sensing device sends an electrical signal to said processor indicating the presence of said wrench head on said wrench head receiving end.

2. The electronic torque wrench of claim 1, wherein said wrench head sensing device is disposed in said socket.

3. The electronic torque wrench of claim 1, wherein said electrical signal is dependent upon which of said pressure switches are activated, said electrical signal indicating to said processor an identity of said wrench head inserted into said socket.

4. The electronic torque wrench of claim 1 further comprising:

a first wrench head having a first pattern of projections on a mounting boss;

a second wrench head having a second pattern of projections on a mounting boss;

wherein said first pattern of projections creates a first electrical signal when inserted into said socket, said second pattern of projections creates a second electrical signal when inserted into said socket, said processor identifying said first and second wrench heads based on said first and second electrical signals, respectively.

5. The electronic torque wrench of claim 4, wherein said user interface further includes a data table stored in a memory bank, said data table correlating each said electrical signal to a given length for each said wrench head.

6. The electronic torque wrench of claim 5, wherein said processor retrieves said given length from said memory bank for said wrench head inserted in said boss, said processor utilizes said given length to compensate a measured torque value and arrive at an actual torque value that equals an actual torque applied to the workpiece by said electronic torque wrench.

7. The electronic torque wrench of claim 4, further comprising a data table stored in a memory bank, said data table including a first length for said first wrench head and a second length for said second wrench head, said processor retrieving said first length when said first electrical signal is received and said second length when said second electrical signal is received.

8. The electronic torque wrench of claim 7, further comprising a torque sensing device carried by said wrench body, said torque sensing device providing a measured torque signal to said processor during application of torque to the workpiece by said electronic torque wrench, wherein said processor utilizes said length of said wrench head retrieved from said data table and said measured torque signal to determine an actual torque value applied to the workpiece.

9. The electronic torque wrench of claim 8, wherein said actual torque value is displayed on said display.

10. An electronic torque wrench for driving a workpiece, comprising:

a wrench body having a handle end and a wrench head receiving end;

a wrench head having a workpiece receiving end and a mounting end, said mounting end removably received by said wrench head receiving end;

a user interface having a processor and a display;

a wrench head sensing device carried by said wrench head receiving end;

an electrical connection between said wrench head sensing device and said processor;

a torque sensing device carried by said wrench body, said torque sensing device providing a measured torque signal to said processor;

a data table stored in a memory bank, said data table including a length of said wrench head; and wherein said wrench head sensing device sends an electrical signal to said processor indicating the presence of said wrench head on said wrench head receiving end;

wherein said processor retrieves said length of said wrench head from said data table upon receipt of said electrical signal.

11. The electronic torque wrench of claim 10, said processor using said measured torque value and said length of said wrench head to determine an actual torque value applied to the workpiece by said electronic torque wrench.

12. The electronic torque wrench of claim 11, wherein said torque sensing device further comprises a strain gauge assembly.

13. The electronic torque wrench of claim 1, wherein said wrench head further comprises a ratchet drive.

14. An electronic torque wrench for driving a workpiece, comprising:

a wrench body having a handle end and a wrench head receiving end including a socket;

a wrench head having a workpiece receiving end and a mounting end, said mounting end including a mounting boss removably received by said socket of said wrench head receiving end and including at least one projection extending therefrom;

a user interface having a processor and a display;

a wrench head sensing device disposed in said socket of said wrench head receiving end, said wrench head sensing device including a plurality of pressure switches;

an electrical connection between said wrench head sensing device and said processor; and wherein each said projection is configured to activate one of said pressure switches when said mounting boss is inserted in said socket such that said wrench head sensing device sends an electrical signal to said processor indicating the presence of said wrench head on said wrench head receiving end.

15. The electronic torque wrench of claim 14, wherein said electrical signal is dependent upon which of said pressure switches are activated, said electrical signal indicating to said processor an identity of said wrench head inserted into said socket.

16. The electronic torque wrench of claim 14, further comprising:

a first wrench head having a first pattern of projections on a mounting boss;

a second wrench head having a second pattern of projections on a mounting boss;

wherein said first pattern of projections creates a first electrical signal when inserted into said socket, said second pattern of projections creates a second electrical signal when inserted into said socket, said processor identifying said first and second wrench heads based on said first and second electrical signals, respectively.

17. The electronic torque wrench of claim 16, wherein said user interface further includes a data table stored in a memory bank, said data table correlating each said electrical signal to a given length for each said wrench head.

18. The electronic torque wrench of claim 17, wherein said processor retrieves said given length from said memory bank for said wrench head inserted in said boss, said processor utilizes said given length to compensate a measured torque value and arrive at an actual torque value that equals an actual torque applied to the workpiece by said electronic torque wrench.

* * * * *